May 14, 1935. W. BRASE 2,001,120
CLUTCHING DEVICE
Filed Feb. 9, 1934 4 Sheets-Sheet 1

INVENTOR
Wilhelm Brase
BY
ATTORNEYS

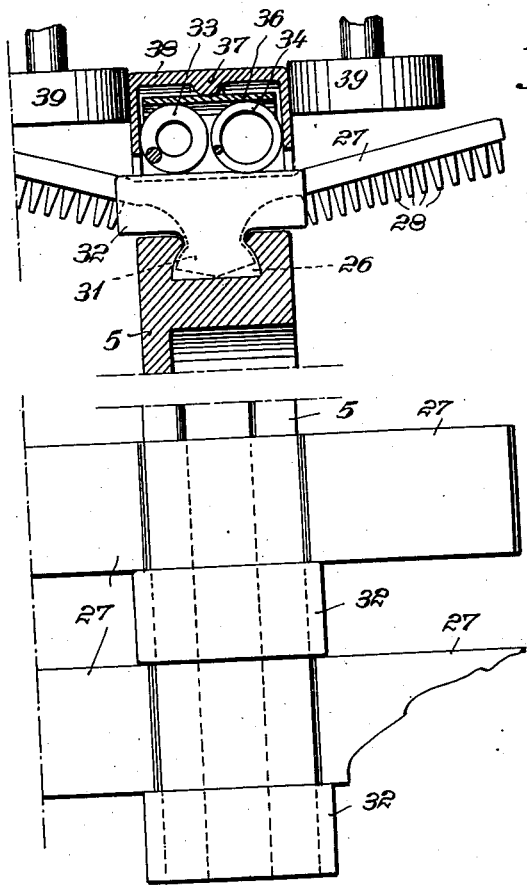
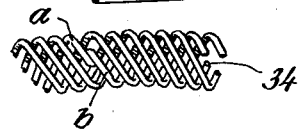

May 14, 1935.  W. BRASE  2,001,120
CLUTCHING DEVICE
Filed Feb. 9, 1934  4 Sheets-Sheet 4
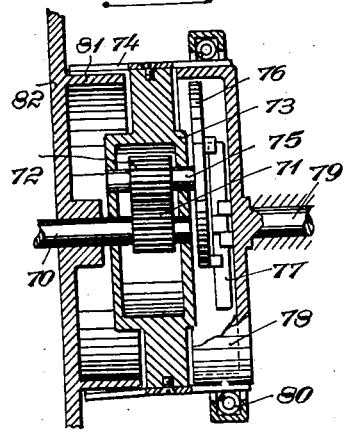
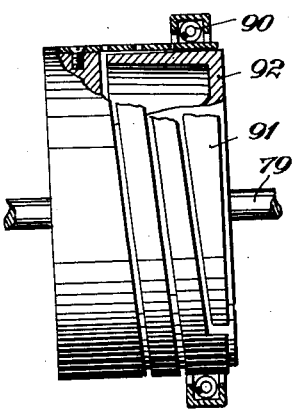
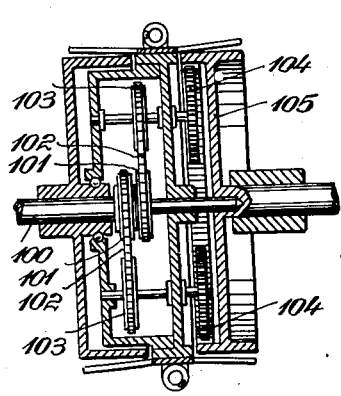
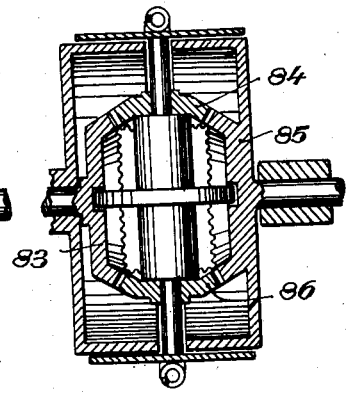
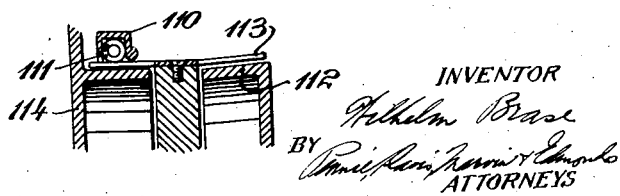
INVENTOR
Wilhelm Brase
BY
ATTORNEYS Patented May 14, 1935

2,001,120

UNITED STATES PATENT OFFICE 2,001,120

CLUTCHING DEVICE

Wilhelm Brase, Berlin, Germany

Application February 9, 1934, Serial No. 710,453
In Germany November 27, 1933

10 Claims. (Cl. 192—79)

This invention relates to clutching devices and has particular reference to clutching devices for use on motor-driven vehicles, although it may be used with equal facility on other machines and apparatus.

In a preferred embodiment of the invention, the clutching device is employed in connection with a variable speed gear, which is referred to and illustrated as an example of the use of the new clutching device.

The coupling is preferably effected by spiral-spring rings of simple or special construction, these rings being movable to cause single- or double-acting cylindrically disposed tongues provided on a first member to grip a second member which is to be coupled to the first member. The tongues may be independent structures or form parts of a steel band bent in the shape of a cylinder, or the like. The spiral-spring rings may be wound of wire in a plurality of turns, in order to lessen their centrifugal action, the two ends of the wire being then connected together in suitable manner. Several types of spiral-spring rings can also coact effectively. For example, in a modified form of the invention, a spiral-spring ring that reacts only slightly to centrifugal force is combined with one having a good centrifugal action. In another form a spiral-spring ring cooperating with a rigid ring is arranged to slide on an inclined plane to effect the coupling. The spring rings are preferably surrounded by guard rings which prevent damage by external agencies.

For a better understanding of the invention, reference may be had to the accompanying drawings, in which Fig. 1 represents a vertical longitudinal section of a gear set provided with the new clutching device;

Fig. 3 shows as a typical embodiment of a modified form and on a larger scale, in part sectional elevation, a double-acting gripper and a combined spring ring with actuating rollers;

Fig. 4 is a plan view of the mechanism illustrated in Fig. 3;

Fig. 5 illustrates a multiple-turn spiral-spring ring;

Figs. 8 to 12 show, in axial section, several modified forms of the clutching device.

Figure 1:
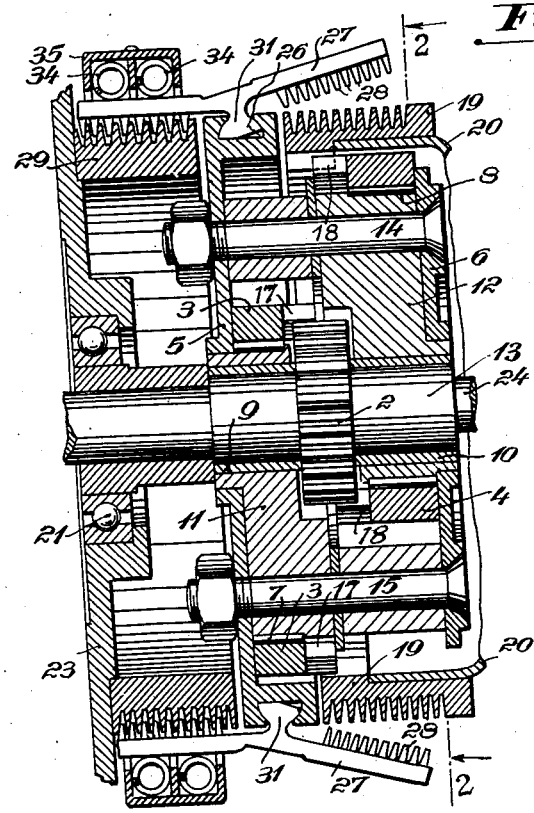

With reference to the drawings, the clutching device according to the invention is shown provided on a gear set. Connected to the flywheel of the internal combustion engine of a vehicle or the like (not shown) is a driving shaft 13 carrying a spur pinion 2 (Figs. 1 and 2) meshing on either side with one or a plurality of eccentric internally-toothed rings 3 and 4 rotatably mounted between circular cheek-plates 5 and 6. In the present form eccentric rings 11 and 12, which are guided on the shaft 13 of the pinion 2 by respective bushings 9 and 10, engage the toothed rings 3 and 4 through bearings 7 and 8. The rings 11 and 12 are connected by bolts 14 and 15 to the cheek-plates 5 and 6. The toothed rings 3 and 4 have lateral teeth 17 and 18 by means of which they mesh both with the pinion 2 and with an internal-tooth ring 19. This ring 19 is centered on a bell 20 rotatably mounted on ball bearing 21 in a fixed wall 22 of the gear case 23. The shaft 13 of the pinion 2 has a journal pin 24 by means of which it is piloted in a bore in the journal (not shown) of the bell 20.

The widened outer rim of cheek-plate 5 is provided with an undercut semi-circular groove 26 in which rock two-armed levers 27 having transverse teeth 28 on their undersides, and the toothed ring 19 has on its periphery grooves corresponding to the lever teeth 28. A ring 29 stationarily seated on an end wall of the gear casing also has similar grooves in its periphery. The ends of the levers are adapted to be pressed alternately into these grooves and thus constitute brake blocks for coupling the cheek-plate 5 either with the ring 29 (as shown in Fig. 1) or with the ring 19. In the former case, the toothed rings 3 and 4 are prevented from turning about the shaft 13, so that the rotation of the pinion 2 is transmitted, with a certain ratio, to the ring 19 by way of the rings 3 and 4. On the other hand, when the lever 27 is coupled with the toothed ring 19, the entire gear system is locked and forms a unit, so that the pinion shaft 13 and the shaft of the bell 20 turn at the same speed.

A large number of these two-armed levers 27 are distributed at spaced intervals around the periphery of the cheek-plate 5. The heads 31 of these levers are held in position by cross members 30. In addition, spacing members 32 (Figs. 3 and 4) are disposed between the several levers 27. Spiral-spring rings 34 are arranged to press the levers 27 onto the ring 19 or 29. Experiments have shown that a spiral spring having its ends connected to form a ring, easily rolls to and fro on a cylindrical surface, notwithstanding its very high specific tension. Consequently, despite the great ease with which they roll, such spring rings are able to exert a very high pressure on their support, and with very little effort this high pressure can be made to act on selected portions of said support. If this support consists of a series of the levers 27 disposed in a circle, said levers act conjointly as a circular tongs. To increase the braking action of such tongs, the undersides of the levers may be provided with tapered transverse teeth, as is the case in the example described above.

Figure 2:
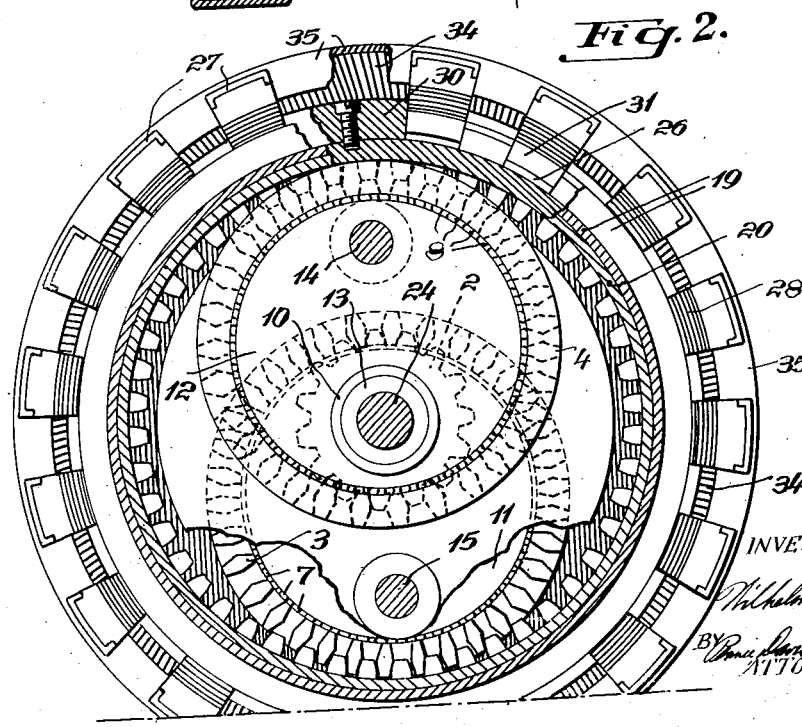
Fig. 2 shows a cross section on line 2—2 of Fig. 1.

In the arrangement of Figs. 1 and 2, two adjacently disposed spring rings 34 are provided for depressing the levers 27. They are surrounded by a guard ring 35, divided into two grooves by a partition, each groove accommodating a spring ring 34.

In order to increase the tension of the spring rings 34 and to expose them as little as possible to centrifugal force when the gear is revolving at high speeds, multiple-turn spring rings, such as those shown in Fig. 5, are employed. A multiple-turn ring can be formed by winding a spiral spring, with a steep pitch, several times around a mandrel or the like in the form of a ring, the ends a, b of the spring then being connected together in suitable manner.

In operation, with the position of the spring crum to press the ring 34 more forcibly against its support.

The necessary movement of the spring rings 33 and 34 is most suitably effected by means of two lateral rollers 39 engaging opposite sides of the guard ring 35 or 38 and jointly actuated by suitable levers, a conventional fluid pressure motor, or the like. The object of the spacing members 32 (Figs. 3 and 4) is to provide support for the spring rings when the levers 27 are in midway position, so that these levers can be moved into a neutral position in which the teeth 28 cannot engage the ring 19 or 29. In that position the gear free-wheels.

Figure 6:
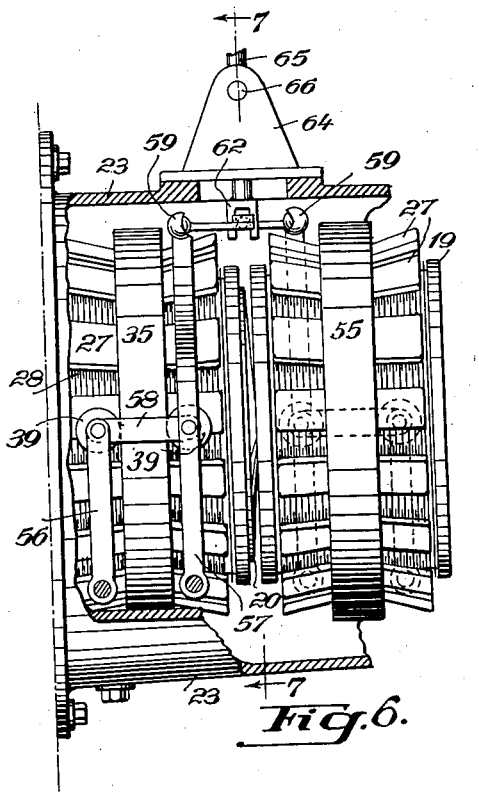
Fig. 6 is a side elevation of the clutching device applied to a double gear set.
Figure 7:
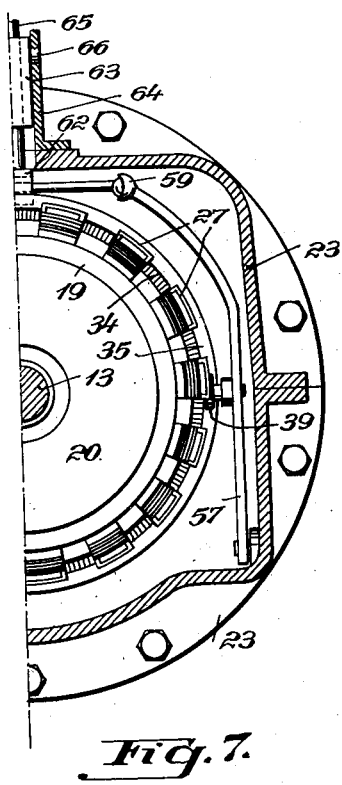
Fig. 7 is a cross-section taken on line 7—7 of Fig. 6.

Figs. 6 and 7 show the manner in which the clutching device, applied e. g. to the gears of an automotive vehicle, may be operated. Each of the two guard rings 35 and 55 is under the influence of rollers 39. These are mounted on arms 56 and 57 pivoted at their lower ends to the gear case and connected together by bars 58, so as to form a parallelogram. The arms 57 are extended upwardly and their ends carry bell sockets 59 for the bells on arms 61 pivoted on the ends of a transverse rod 60. The latter is engaged by a fork 62 forming the end of the bent gear lever 65. This lever 65 turns in a sleeve 63, pivoted at 66 in a hood 64 suitably mounted on the cover of the gear case.

The embodiment of a clutching device according rugged, efficient, and flexible, and, while several preferred embodiments have been illustrated and described herein, it is to be understood that the invention is not limited thereby, but is susceptible of changes in form and detail within its scope.

What I claim is:

1. In a clutching device, the combination of a driving member, a driven member, one member having substantially cylindrical clutch surfaces, a plurality of levers arranged axially around the other member in clutching relation with said surfaces, a spring ring encircling said levers, and means for axially moving said ring to urge said levers into clutching engagement with said surfaces.

2. In a clutching device, the combination of a rotary driving member, a rotary driven member, and means for connecting the members including cylindrically arranged clutching devices adapted to frictionally engage the members, and an axially movable spring ring encircling said devices for actuating them into engagement with a corresponding member.

3. In a clutching device, the combination of a rotary driving member, a rotary driven member, and means for connecting the members including cylindrically arranged peripherally engaging clutching devices and an axially movable ring for actuating said devices, said ring being responsive to the centrifugal force of rotation of the members to vary the clutching effect of said devices.

4. In a clutching device, the combination of a rotary driving member, a rotary driven member, means for connecting the members including cylindrically arranged clutching devices and an axially movable ring for actuating said devices, said ring having an accompanying ring responsive to the centrifugal force of rotation of the members, and connecting elements actuated by said second ring for regulating the radial pressure of the first ring on the devices in accordance with the said centrifugal force.

5. In a clutching device, the combination of a rotary driving member, a rotary driven member, means for connecting the members including cylindrically arranged clutching devices, one of said members having a tapered surface for cooperation with said devices, and an axially movable ring including a multiple turn spring for actuating said devices.

6. In a clutching device, the combination of a rotary driving member, a rotary driven member, and means for connecting the members including a plurality of cylindrically arranged clutching levers carried by one of the members and adapted to frictionally engage the other member, and a spring ring encircling said levers and movable axially along them for engaging them with said other member.

7. In a clutching device, the combination of a rotary driving member, a rotary driven member, and means for connecting the members including a plurality of cylindrically arranged clutching levers carried by one of the members and having serrated surfaces adapted to frictionally engage complementary serrated surfaces on the other member, and a spring ring encircling said levers and movable axially along them for engaging them with said other member.

8. In a clutching device, the combination of a rotary driving member, a rotary driven member, and means for connecting the members including a plurality of cylindrically arranged clutching levers pivoted on one of the members and adapted to frictionally engage the other member, and a spring ring encircling said levers and movable axially along them for engaging them with said other member.

9. In a clutching device, the combination of a rotary driving member, a rotary driven member, and means for connecting the members including a plurality of cylindrically arranged clutching levers pivoted on one of the members and having serrated surfaces adapted to frictionally engage complementary serrated surfaces on the other member, and a spring ring encircling said levers and movable axially along them for engaging them with said other member.

10. In a clutching device, the combination of a pair of axially arranged cylindrical members, at least one of which is driven, and means for connecting the members including a plurality of serrated clutching levers on one member and extending in an axial direction over the other member, said other member having complementary serrations on its cylindrical surface, a spring ring encircling said clutching levers, and means for moving said ring axially to engage and disengage said levers from the corresponding serrated surface of said other member.

WILHELM BRASE.

CERTIFICATE OF CORRECTION.

Patent No. 2,001,120.  May 14, 1935.

WILHELM BRASE.

It is hereby certified that error appears in the printed specification of the above numbered patent requiring correction as follows: Page 2, first column, line 47, after "driven" insert the words in the reverse direction; and that the said Letters Patent should be read with this correction therein that the same may conform to the record of the case in the Patent Office.

Signed and sealed this 18th day of June, A. D. 1935.

(Seal)

Leslie Frazer
Acting Commissioner of Patents.